United States Patent
Isomura et al.

(10) Patent No.: US 7,923,060 B2
(45) Date of Patent: Apr. 12, 2011

(54) METHOD OF MANUFACTURING CERAMIC FILTER

(75) Inventors: Manabu Isomura, Tsushima (JP); Tatsuya Hishiki, Nagoya (JP); Ichiro Wada, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 573 days.

(21) Appl. No.: 11/850,697

(22) Filed: Sep. 6, 2007

(65) Prior Publication Data
US 2008/0093008 A1 Apr. 24, 2008

(30) Foreign Application Priority Data
Oct. 18, 2006 (JP) .................................. 2006-284402

(51) Int. Cl.
*B01D 71/02* (2006.01)
*B01D 53/22* (2006.01)
*B01D 71/00* (2006.01)

(52) U.S. Cl. ........ 427/140; 427/235; 427/238; 427/294; 427/532; 427/541; 95/43; 95/45; 210/348; 210/490; 210/496; 210/497.01; 210/500.23

(58) Field of Classification Search .................. 264/603; 427/140, 294, 532, 541; 55/486, 487, 488, 55/489, 523
See application file for complete search history.

(56) References Cited

U.S. PATENT DOCUMENTS

| | | | |
|---|---|---|---|
| 4,711,719 A | | 12/1987 | Leenaars et al. |
| 4,737,323 A | * | 4/1988 | Martin et al. .................. 264/4.3 |
| 5,672,388 A | | 9/1997 | McHenry et al. |
| 5,762,841 A | * | 6/1998 | Shimai et al. .................. 264/44 |
| 5,770,275 A | | 6/1998 | Raman et al. |
| 5,772,735 A | * | 6/1998 | Sehgal et al. ..................... 95/45 |
| 6,383,563 B1 | * | 5/2002 | Bratton et al. ................. 427/244 |
| 2008/0096751 A1 | * | 4/2008 | Isomura et al. .................. 501/39 |

FOREIGN PATENT DOCUMENTS

| | | |
|---|---|---|
| EP | 0 401 928 A1 | 12/1990 |
| JP | 03-267129 | 11/1991 |
| JP | 2006297179 | * 11/2006 |

OTHER PUBLICATIONS

Tsuru et al., "Silica-zirconia membranes for nanofiltration," Journal of Membrane Science 149 (1998) p. 127-135.

* cited by examiner

*Primary Examiner* — Michael Kornakov
*Assistant Examiner* — Lisha Jiang
(74) *Attorney, Agent, or Firm* — Burr & Brown

(57) ABSTRACT

There is disclosed a method of manufacturing a thin and uniform ceramic filter formed with less membrane formation times and having less defects. A ceramic sol whose average pore diameter after the sol itself has been formed into a membrane is larger than that of a ceramic separation membrane and is 10 nm or less is brought into contact with the surface of a ceramic separation membrane having an average pore diameter of 0.5 to 10 nm, and the ceramic separation membrane having the ceramic sol is dried and then fired to repair a defect portion of the ceramic separation membrane.

3 Claims, 5 Drawing Sheets

US 7,923,060 B2

METHOD OF MANUFACTURING CERAMIC FILTER

BACKGROUND OF THE INVENTION

The present invention relates to a method of manufacturing a ceramic filter. More particularly, it relates to a method of manufacturing a thin and uniform ceramic filter having less defects.

Heretofore, various methods of forming a ceramic porous membrane on a porous base member have been known. For example, a hot coating process is known (see Non-Patent Document 1). This is a method of rubbing a tube base member with cloth containing a silica sol to apply the sol, thereby forming a porous membrane on an outer surface of the heated tube base member.

A method of forming a porous membrane on an inner surface of a porous base member having a tubular shape or a cylindrical lotus-root-like monolith shape by filtering membrane formation is also known (see Patent Document 1). The outer surface of the porous base member is held at a pressure lower than that of an inner surface thereof which comes in contact with a sol liquid to form the membrane on the inner surface of the porous base member.

[Patent Document 1] Japanese Patent Application Laid-Open No. 3-267129
[Non-Patent Document 1] Journal of Membrane Science 149 (1988) 127 to 135

However, the hot coating process has a problem that the membrane cannot uniformly be formed on the whole base surface, and the membrane can be formed on the only outer surface of the tube base member. The process cannot be applied to any monolith-type base. On the other hand, in the filtering membrane formation process, during drying of the formed membrane, a solvent present in base pores sometimes flows out on a membrane side to cause membrane peeling. As a result, there is a problem that a defect is generated in the porous membrane formed on the fired base surface. A dip coating process can be applied to the monolith-type base, but the number of membrane formation times is large.

An object of the present invention is to provide a method of manufacturing a thin and uniform ceramic filter formed with less membrane formation times and having less defects.

SUMMARY OF THE INVENTION

The present inventors have found that the above-mentioned object can be achieved by employing a method of supplying a new ceramic sol on a ceramic separation membrane to bring the sol into contact with the membrane, and then drying and firing the membrane having the sol to repair a defect portion of the ceramic separation membrane. That is, according to the present invention, the following method of manufacturing a ceramic filter is provided.

[1] A method of manufacturing a ceramic filter, comprising: bringing, into contact with the surface of a ceramic separation membrane having an average pore diameter of 0.5 to 10 nm, a ceramic sol whose average pore diameter after the sol itself has been formed into a membrane is larger than that of the ceramic separation membrane and is 10 nm or less; and drying and then firing the ceramic separation membrane having the ceramic sol to repair a defect portion of the ceramic separation membrane.

[2] The method of manufacturing the ceramic filter according to the above [1], which further comprises: filling cells of the ceramic filter with the ceramic sol; and setting, to a low pressure, the ceramic separation membrane constituting the ceramic filter on the side of a base member to repair the defect portion of the ceramic separation membrane with the ceramic sol.

[3] The method of manufacturing the ceramic filter according to the above [1] or [2], wherein a component of the ceramic sol is silica.

The new ceramic sol is supplied and brought into contact with the ceramic separation membrane, then dried and fired, whereby the defect portion of the ceramic separation membrane can be repaired. That is, when the defect portion is selectively filled, the membrane does not have to be formed to be thick, and a membrane having a high separability and a high flux can be prepared with reduced costs.

DESCRIPTION OF THE REFERENCE NUMERALS

1:ceramic separation membrane (silica membrane), 2:defect portion, 10:ceramic filter, 11:porous base member (MF membrane), 14:UF membrane, 22:partition wall, 23:cell, 25:inlet-side end surface.

DETAILED DESCRIPTION OF THE INVENTION

An embodiment of the present invention will hereinafter be described with reference to the drawings. The present invention is not limited to the following embodiment, and can be changed, modified or improved without departing from the scope of the present invention.

Figure 1:
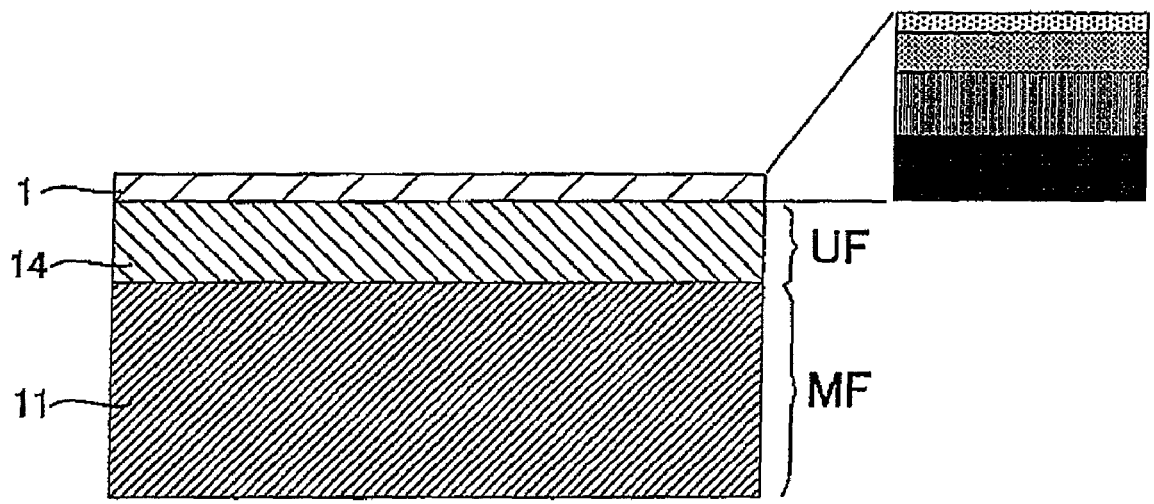
FIG. 1 is a sectional view of a ceramic filter according to one embodiment of the present invention.

FIG. 1 shows a ceramic separation membrane 1 of the present invention. With regard to the ceramic separation membrane 1, a UF membrane 14 which is an ultrafiltration membrane is formed on a microfiltration membrane (the MF membrane), and the ceramic separation membrane 1 is formed on the UF membrane 14. The ceramic separation membrane 1 has a multilayered structure in which layers of a ceramic sol are laminated a plurality of times, and has an average pore diameter of 0.5 to 10 nm. As the ceramic separation membrane 1, for example, titania, silica or the like may be employed.

Figure 2:
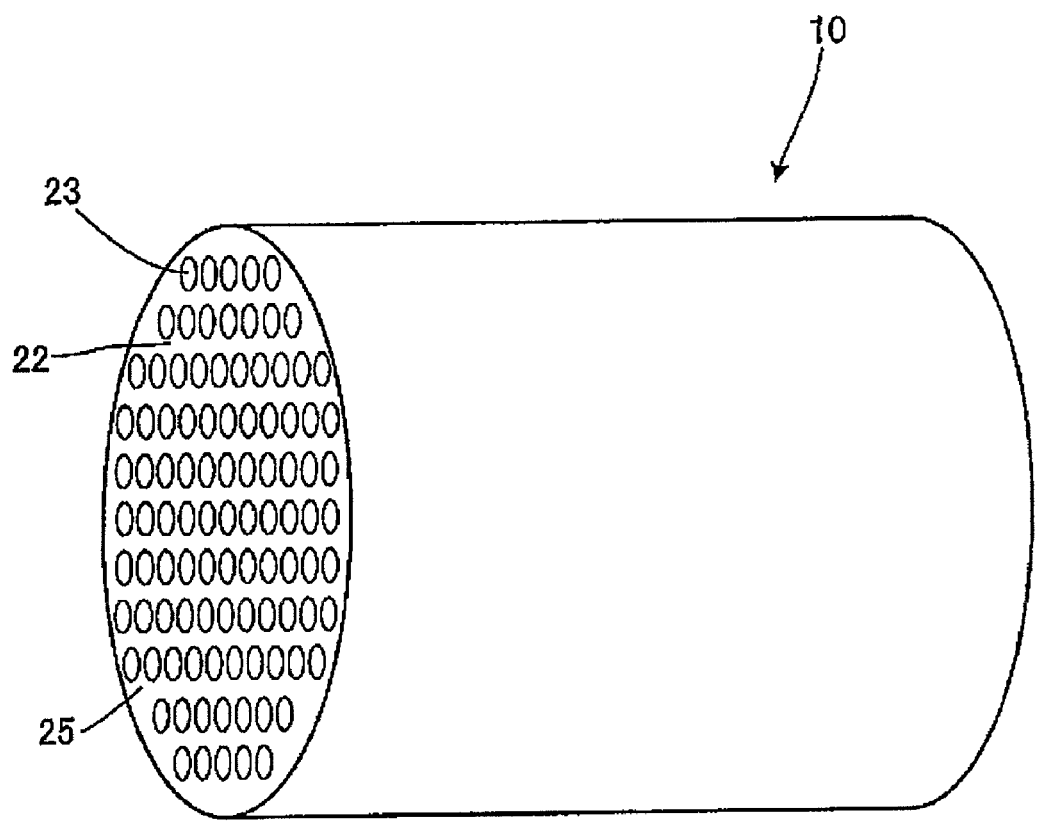
FIG. 2 is a perspective view of the ceramic filter according to the embodiment of the present invention.

Next, one embodiment of a ceramic filter 10 in which the ceramic separation membrane 1 is formed according to the present invention will be described with reference to FIG. 2. The ceramic filter 10 of the present invention has a monolith shape including a plurality of cells 23 defined by partition walls 22 to form fluid passages in an axial direction. In the present embodiment, the cells 23 have a circular section, and the ceramic separation membrane 1 shown in FIG. 1 is formed on inner wall surfaces of the cells. The cells 23 may be formed so as to have a hexagonal or quadrangular section. According to such a structure, for example, when a mixture (e.g., water and acetic acid) is introduced into the cells 23 from an inlet-side end surface 25, one of constituting elements of the mixture is separated at the ceramic separation membrane 1 formed on the inner walls of the cells 23, transmitted through the porous partition walls 22 and discharged from an outermost wall of the ceramic filter 10, so that the mixture can be separated. That is, the ceramic separation membrane 1 formed in the ceramic filter 10 can be used as a separation membrane, and has a high separation characteristic with respect to, for example, water and acetic acid.

Figure 3A:
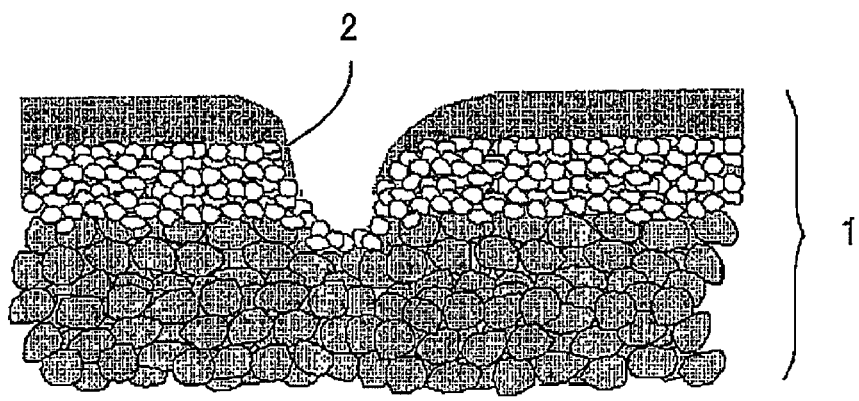
FIGS. 3(a)(b) are explanatory views of repair of a ceramic separation membrane.

Next, a method of manufacturing the ceramic separation membrane 1 will be described. As shown in FIG. 3(a), the ceramic separation membrane 1 has a defect portion 2. To repair this defect portion 2, a porous base member 11 provided with the ceramic separation membrane 1 is installed in a membrane formation chamber so that through holes of the base member are arranged in a vertical direction. A ceramic sol liquid is stored in a tank, and supplied to an inner wall surface of the porous base member 11 installed in the membrane formation chamber from an underside of the base member via a valve by use of a liquid supply pump. In consequence, the ceramic sol liquid comes in contact with the inner wall surface of the porous base member 11 provided with the ceramic separation membrane 1.

As a ceramic sol for use in the repair, a material having pore diameters larger than those of the ceramic separation membrane after the material itself has been formed into a membrane is used so as to prevent a drop of a flux of the separation membrane. The pore diameters of the material after the material itself has been formed into the membrane define the pore diameters of the ceramic separation membrane into 10 nm or less, because if the pore diameters are larger than this range, repair operations need to be performed many times.

Subsequently, at a stage where the ceramic sol liquid is supplied beyond an upper end portion of the porous base member 11, liquid supply is stopped to discharge the ceramic sol liquid from the downside of the porous base member 11. More preferably, after the liquid supply is stopped, vacuum suction is performed from a secondary side (a side of a surface on which any membrane is not to be formed) of the porous base member 11 by use of a vacuum pump. Afterward, opening/closing of the valve is adjusted to discharge the ceramic sol liquid from the downside of the porous base member 11. The secondary side is set to a low pressure, whereby the defect portion can more selectively be filled. It is to be noted that, for example, in a case where many defects are generated in an end portion of the ceramic separation membrane and the corresponding portion only is repaired, the portion may only be submerged into a slurry.

Figure 3B:
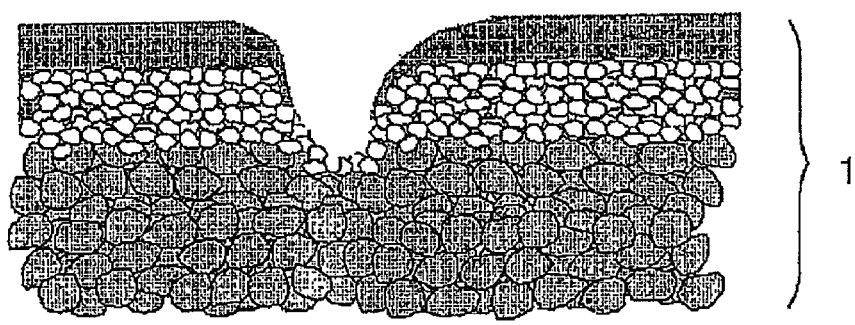

Subsequently, after the ceramic sol liquid is discharged, the porous base member 11 is fired, whereby the ceramic separation membrane 1 in which the defect portion 2 has been repaired is formed on the inner wall surface of the porous base member 11 as shown in FIG. 3(b). That is, filtering membrane formation is performed in a final step of the formation of the ceramic separation membrane 1, whereby the ceramic separation membrane 1 having the defect portion 2 repaired can be formed.

Figure 4:
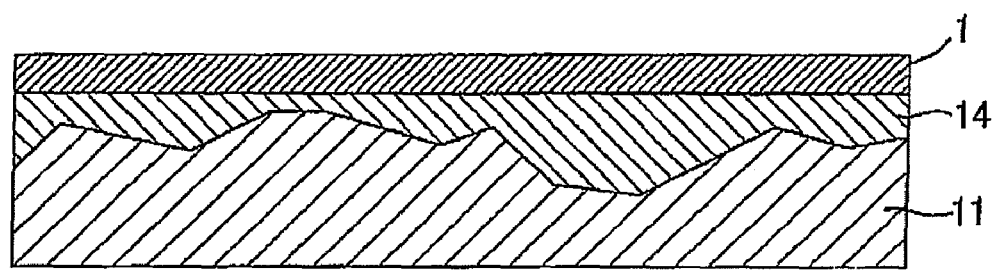
FIG. 4 is an explanatory view of the ceramic separation membrane in a case where a UF membrane is formed.

The ceramic separation membrane 1 is formed by the above-mentioned steps. That is, as shown in FIG. 4, the ceramic separation membrane 1 can be formed as a thin membrane having less defects. That is, the silica membrane 1 having a high flux and a high separability can be formed with reduced costs. It is to be noted that a manner of bringing the defect portion into contact with the slurry is not limited to the above-mentioned manner, and the slurry may be allowed to naturally drop down from an upper portion of the base member.

On the other hand, in a case where the membrane having less defects is to be formed without performing the repair of the present invention, the number of repeated membrane formation times increases, the membrane eventually thickens, and the membrane having a low flux is formed with increased costs.

The ceramic filter 10 obtained as described above and having the nano-level thin-membrane-like silica membrane 1 formed on the inner wall surface thereof can preferably be used as a filter which separates a mixed liquid or the like.

EXAMPLES

A manufacturing method of the present invention will hereinafter be described in accordance with examples in more detail, but the present invention is not limited to these examples. First, a porous base member, a ceramic sol liquid, a membrane forming method and the like used in the present example will be described.

Example

A ceramic separation membrane was repaired by the following procedure on membrane formation conditions shown in Table 1.

(1) Repair of Ceramic Separation Membrane

A sample (a ceramic separation membrane) was installed in a membrane formation chamber, a ceramic sol liquid was supplied into a porous base member 11, and the liquid supply was stopped at a stage where the liquid was supplied beyond an upper end portion of the porous base member 11. Afterward, opening/closing of a valve was adjusted to discharge the ceramic sol liquid from the downside of the porous base member 11. In a case where vacuum suction is performed, the vacuum suction (filtering suction) was performed from a secondary side (a side of a surface on which any membrane is not formed) of the porous base member 11 by use of a vacuum pump before the ceramic sol liquid was discharged.

(2) Drying

Cells 23 of the porous base member 11 into which a ceramic sol was poured were dried for one hour by use of a drier so that air at room temperature passed through the cells. A speed at which cold air for drying passed through the cells 23 was set to 5 m/second.

(3) Firing

In an electric furnace, a temperature was raised at a ratio of 100° C./hr, retained at 500° C. for one hour, and then lowered at a ratio of 100° C./hr.

(Evaluation)

(1) $N_2$ Leak Amount

Pores having a diameter of 10 nm or more were regarded as defects, and $N_2$ leak amounts were measured before and after repair. As the $N_2$ leak amount, a gas flow rate at a time when a substance to be condensed in a saturated state was allowed to flow downwards in the method described in Non-Patent Document 1 was measured. It is to be noted that the $N_2$ leak amount was indicated as a ratio with respect to an $N_2$ transmission amount in a case where the substance to be condensed was not passed. However, in Non-Patent Document 1, water vapor and nitrogen were used, whereas in the example, n-hexane and nitrogen were used. A downward flowing gas at the time when the substance to be condensed in the saturated state was allowed to flow downwards passed through a defect having a power diameter of 50 nm or more.

(2) Water-Ethanol Separation Test

A water-ethanol separation test was conducted. Specifically, an aqueous solution having a temperature of 70° C. and an ethanol concentration of 90% was circulated through cells of a silica membrane monolith (a cell inner diameter of 3 mm, 37 cells) of φ30×65 L at a liquid supply speed of 12 L/min. A pressure was reduced from a side surface of a base member with a vacuum degree of about 2 to 5 Pa, and a transmitted liquid from the base member side surface was trapped with a liquid nitrogen trap. A separation factor was calculated from the ethanol concentrations of the transmitted and trapped liquid and an original liquid before transmitted.

(3) Pore Diameter Distribution

A pore diameter distribution was measured. A measurement principle of the pore diameters was the same as that of the method described in Non-Patent Document 1, but in the document, water vapor and nitrogen were used, whereas in the present measurement, n-hexane and nitrogen were used.

(Result)

The $N_2$ leak amounts before and after the repair are shown in Table 1. It is to be noted that pore diameters of a repair sol in Table 1 are indicated as an average pore diameter of the ceramic sol after the sol which has repaired the defect portion of the ceramic separation membrane is formed into a membrane.

TABLE 1

| | Material of ceramic separation membrane | Pore diameter of ceramic separation membrane (nm) | Repair sol | | $N_2$ leak ratio (%) before repair | $N_2$ leak ratio (%) after repair |
| | | | Pore diameter (nm) | Material | Presence of filtering suction | | |
| --- | --- | --- | --- | --- | --- | --- | --- |
| Example 1-1 | Titania | 1.5 | 2 | Titania | None | 11 | 1.8 |
| Example 1-2 | Silica | 0.5 | 1 | Silica | None | 16 | 2.3 |
| Example 1-3 | Silica | 5 | 10 | Silica | None | 24 | 2.7 |
| Example 1-4 | Titania | 10 | 10 | Zirconia | None | 40 | 3.6 |
| Example 1-5 | Silica | 10 | 10 | Silica | None | 49 | 4.9 |
| Example 2-1 | Silica | 1 | 2 | Silica | Present | 16 | 0.8 |
| Example 2-2 | Silica | 10 | 10 | Silica | Present | 49 | 1.7 |
| Example 2-3 | Silica | 0.5 | 1 | Silica | Present | 16 | 0.7 |
| Comparative example 1-1 | Titania | 1.5 | 30 | Titania | None | 11 | 11 |
| Comparative example 1-2 | Zirconia | 20 | 40 | Silica | None | 77 | 75 |
| Comparative example 1-3 | Silica | 0.5 | 20 | Silica | None | 16 | 16 |
| Comparative example 2-1 | Silica | 0.5 | 20 | Silica | Present | 16 | 15 |

As shown in Table 1, an $N_2$ leak ratio after the repair largely decreased in Examples 1-1 to 2-3. On the other hand, an effect was scarcely obtained in Comparative Examples 1-1 to 2-1.

Moreover, results of the water-ethanol separation tests of Examples 1-2, 2-3 and Comparative Example 2-1 are shown in Table 2.

TABLE 2

| | Before repair | | After repair | |
| --- | --- | --- | --- | --- |
| Sample | Separation factor | Flux (kg/m²h) | Separation factor | Flux (kg/m²h) |
| Example 1-2 | 50 | 3.0 | 500 | 2.0 |
| Example 2-3 | 50 | 3.0 | 1000 | 3.0 |
| Comparative example 2-1 | 50 | 3.0 | 50 | 3.0 |

As shown in Table 2, Examples 1-2, 2-3 and Comparative Example 2-1 had different repair conditions, and in Example 1-2, the flux slightly dropped after the repair, but the separation factor was improved. In Example 2-3, since defects could selectively be repaired by vacuum suction, the flux did not change, and the only separation factor could largely be improved. On the other hand, in Comparative Example 2-1 in which a repair treatment was performed on conditions departing from the range of the present invention, both of the separation factor and the flux did not change.

Figure 5:
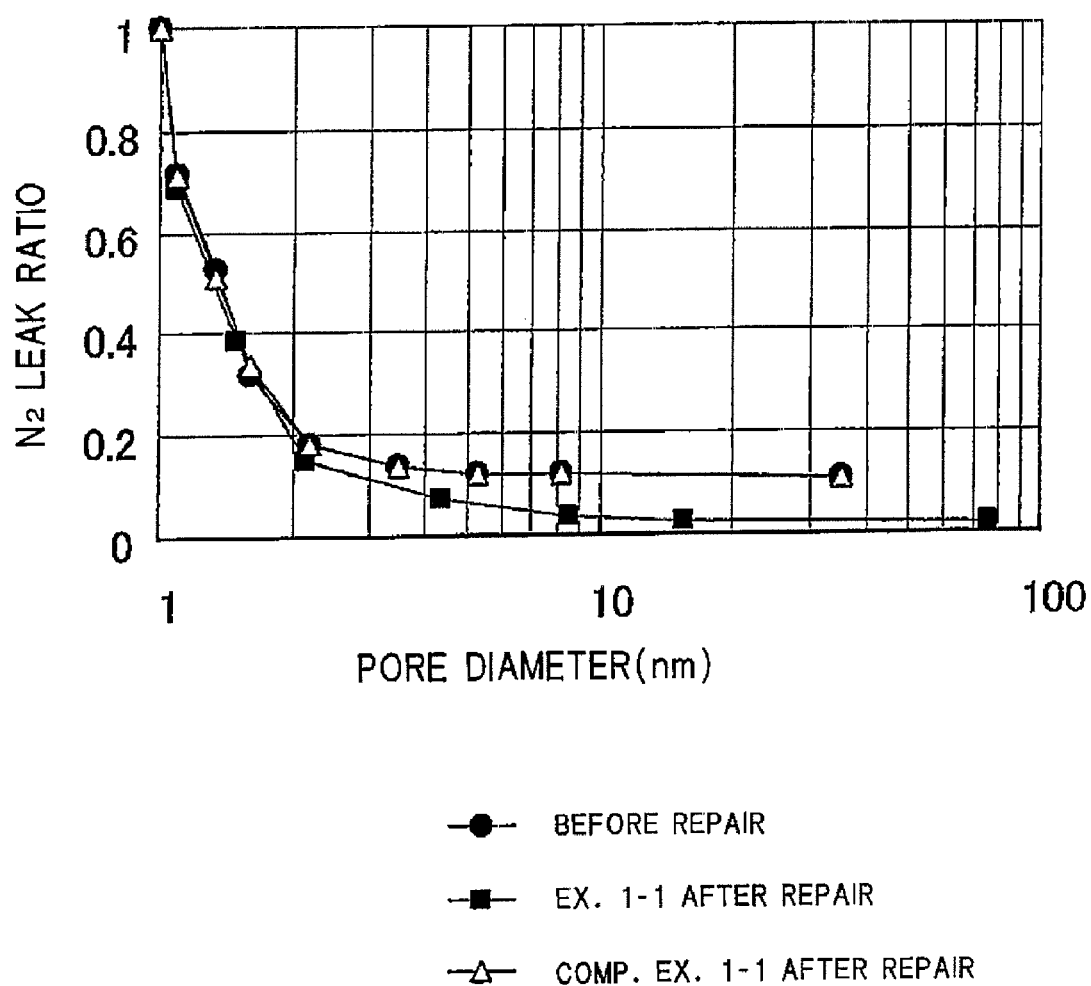
FIG. 5 is a diagram showing $N_2$ leak ratios with respect to pore diameters.

Furthermore, FIG. 5 shows $N_2$ leak ratios with respect to pore diameters in Example 1-1 and Comparative Example 1-1. It is seen that in Example 1-1, the $N_2$ leak ratio decreased as compared with the example before the repair and Comparative Example 1-1. It is to be noted that the pore diameters at an $N_2$ leak ratio of 0.5 in FIG. 5 correspond to those of the ceramic separation membrane in Table 1.

As described above, after the ceramic sol liquid is supplied to the surface of the ceramic separation membrane, the ceramic separation membrane on the base member side is set to the low pressure to fill the defect portion 2 of the ceramic separation membrane with the ceramic sol and repair the portion, whereby the thin ceramic separation membrane 1 having less defects can be obtained.

According to the present invention, a thin and uniform membrane having less coarse and large pores and less defects can be obtained with less membrane formation times. Therefore, a ceramic filter provided with such a ceramic separation membrane can preferably be used as a filter. A ceramic filter including a nano-level thin-membrane-like ceramic separation membrane formed on the inner wall surface thereof can be used in a portion where an organic filter cannot be used, for example, separation removal or the like in an acidic or alkaline solution or an organic solvent.

What is claimed is:

1. A method of manufacturing a ceramic filter, comprising: bringing, into contact with the surface of a ceramic separation membrane having an average pore diameter of 0.5 to 10 nm, a ceramic sol whose average pore diameter after the sol itself has been formed into a membrane is larger than that of the ceramic separation membrane and is 10 nm or less; and drying and then firing the ceramic separation membrane having the ceramic sol to repair a defect portion of the ceramic separation membrane.

2. The method of manufacturing the ceramic filter according to claim 1, which further comprises: filling cells of the ceramic filter with the ceramic sol; and setting, to a low pressure, the ceramic separation membrane constituting the ceramic filter on the side of a base member to repair the defect portion of the ceramic separation membrane with the ceramic sol.

3. The method of manufacturing the ceramic filter according to claim 1, wherein a component of the ceramic sol is silica.

* * * * *